Figure 5:
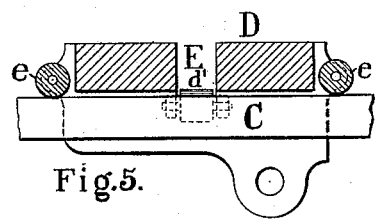

W. W. SEFTON & A. H. GLENDINNING.
WORK HOLDER FOR SEWING AND OTHER MACHINES.
APPLICATION FILED JULY 1, 1907.
906,311. Patented Dec. 8, 1908.
3 SHEETS—SHEET 1.
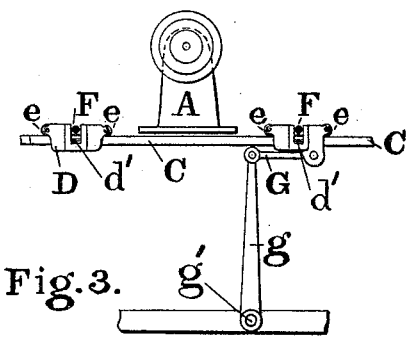
Fig. 3.
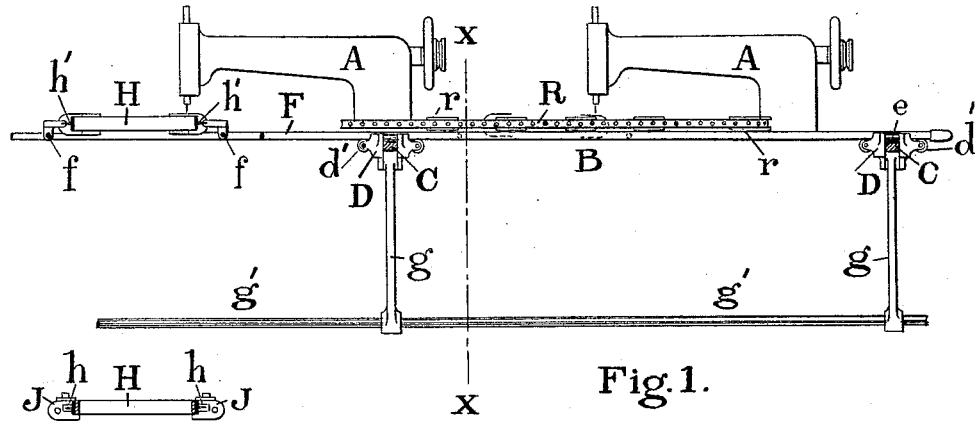
Fig. 1.
Fig. 16.
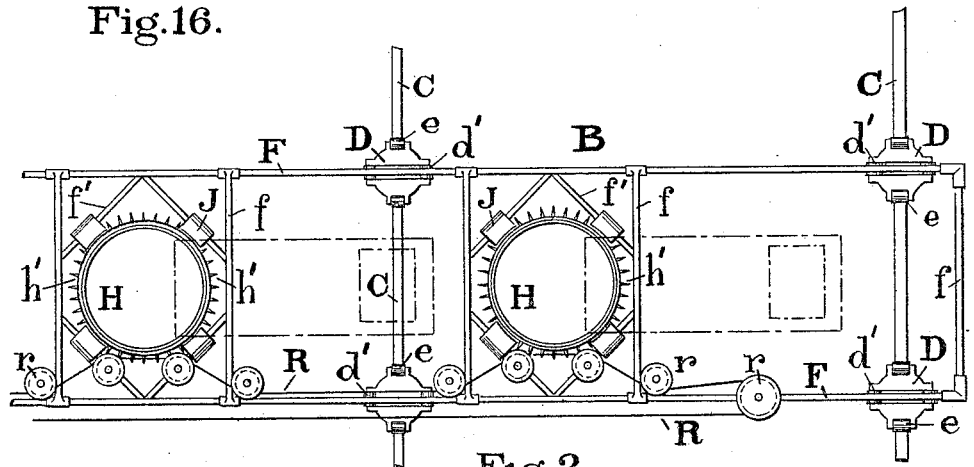
Fig. 2.
WITNESSES.
E. Howard
Joseph Bates.
INVENTORS.
W. W. Sefton
A. H. Glendinning W. W. SEFTON & A. H. GLENDINNING.
WORK HOLDER FOR SEWING AND OTHER MACHINES.
APPLICATION FILED JULY 1, 1907.

906,311.

Patented Dec. 8, 1908.
3 SHEETS—SHEET 2.

WITNESSES.
E. Howard
Joseph Bates.

INVENTORS.
W. W. Sefton
A. H. Glendinning
By [signature] atty.

W. W. SEFTON & A. H. GLENDINNING.
WORK HOLDER FOR SEWING AND OTHER MACHINES.
APPLICATION FILED JULY 1, 1907.

906,311.

Patented Dec. 8, 1908.

3 SHEETS—SHEET 3.

WITNESSES.
E. Howard
Joseph Bates.

INVENTORS.
W. W. Sefton
A. H. Glendinning
by Cowden O'Brien
atty

UNITED STATES PATENT OFFICE.

WALTER W. SEFTON AND ACHESON HARDEN GLENDINNING, OF BELFAST, IRELAND.

WORK-HOLDER FOR SEWING AND OTHER MACHINES.

No. 906,311.  Specification of Letters Patent.  Patented Dec. 8, 1908.

Application filed July 1, 1907. Serial No. 381,769.

*To all whom it may concern:*

Be it known that we, WALTER WILLIAM SEFTON and ACHESON HARDEN GLENDINNING, British subjects, and residents both of Belfast, in the county of Antrim, Ireland, have invented certain new and useful Improvements in Work-Holders for Sewing and other Machines, of which the following is a specification.

This invention relates to sewing machines used for embroidery, tambour, spoke and hem stitching and other purposes, more particularly to such machines as have a number of heads or needles, and is applicable also to other machines with fixed arms or heads such as are used for glass cutting, die sinking, block printing, embossing, and other purposes, where it is desired to duplicate reproduce or multiply the design or pattern being worked by one arm or head of the machine, and is designed to provide apparatus for carrying the fabric or fabrics or article or articles to be operated upon by the different heads capable of moving such fabrics or articles similarly and simultaneously under the different heads or arms so that the operative portion of the several heads or arms produces similar patterns or designs on the several fabrics or articles.

Multiple machines for sewing button holes are known in which a specific and limited feed has been given to a piece of fabric to uniformly guide a number of button holes under the needles, but the present invention is applicable to all classes of sewing and other machines having fixed arms or heads in which it is desired to duplicate or multiply a design or pattern and the motion given to the article or articles under the arms or heads is universal and can be guided and controlled in any direction at the will of the operator.

The invention consists essentially of a common or connected frame or carrier arranged under the several heads or arms of the machine on which the fabrics or articles to be operated on are spread or mounted and held in position by suitable means the frame being capable of being moved so that the fabrics or articles under the several heads are moved similarly and simultaneously by one operator so that the same pattern is produced on each.

The invention will be fully described with reference to the accompanying drawings which show the invention as applied to a sewing machine.

Figure 6:
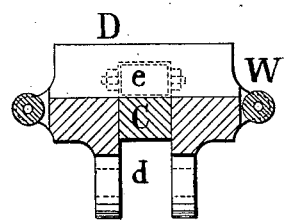
Figure 4:
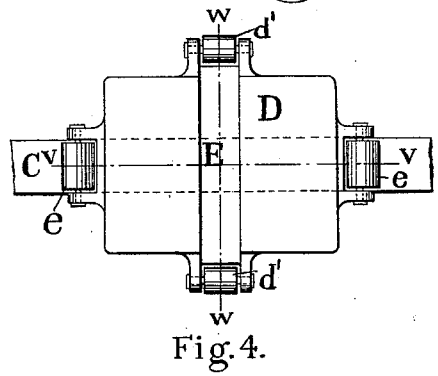
Figure 7:
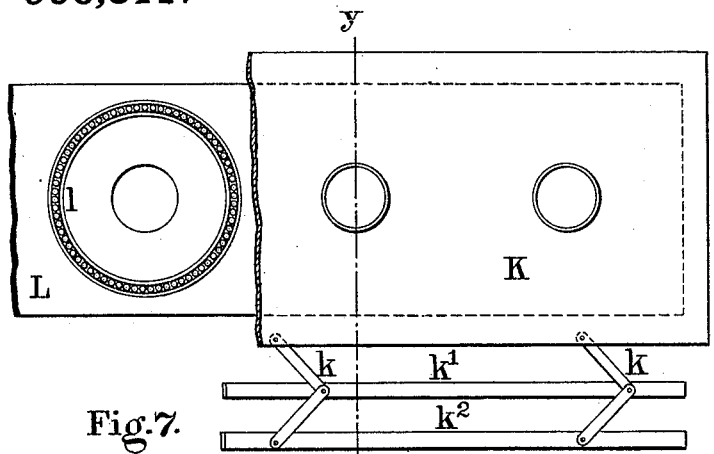
Figure 8:
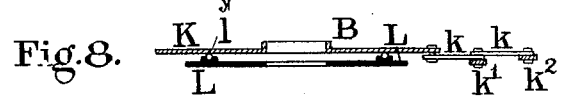
Figure 9:
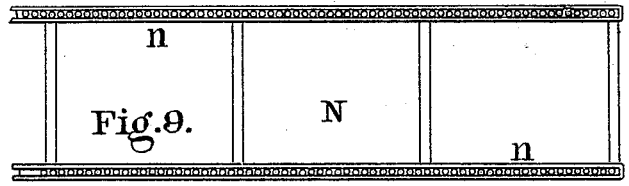
Figure 12:
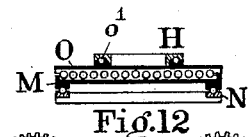
Figure 10:
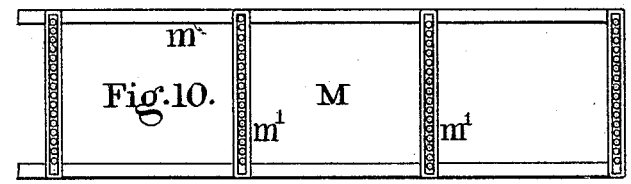
Figure 15:
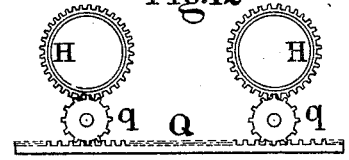
Figure 11:
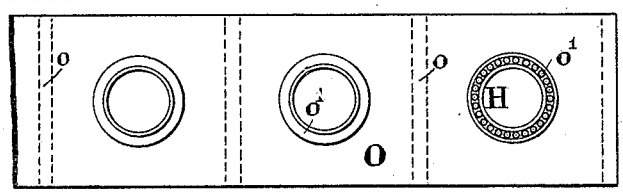
Figure 14:
Figure 13:
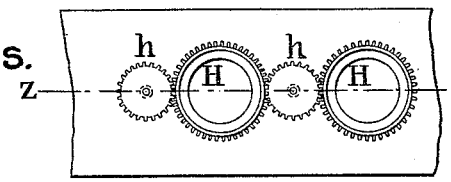

Figure 1 is a front view of machine showing two heads constructed according to the invention. Fig. 2. is a plan of movable frame or carrier showing the heads removed. Fig. 3. is a section on line $x$—$x$ Fig. 1. Fig. 4. is a plan of universal bracket for frame. Fig. 5. is a section on line $v$—$v$ Fig. 4. Fig. 6. is a section on line $w$—$w$ Fig. 4. Fig. 7. is a plan showing modified form of movable frame. Fig. 8. is a section on line $y$—$y$ Fig. 7. Figs. 9, 10 and 11. are plans showing component parts of another form of frame. Fig. 12. is a cross section of same assembled. Fig. 13. is a plan of modified method for giving circular motion to the work holder. Fig. 14. is a section on line $z$—$z$ Fig. 13. Fig. 15. is a plan showing another modification for same. Fig. 16. is a detail showing method of mounting workholder shown in Fig. 1.

The heads A of the machine may be of any suitable construction being preferably provided with needles to which an oscillating or zig-zag motion can be given. The frame or carrier B is mounted on rails C supported in any suitable way and preferably though not necessarily independently of the base of the machine. Arranged to run upon the rails C are runners or brackets D. The brackets D are formed with a slot guide or groove $d$ underneath into which the rail C enters and rollers $e$ which run upon the said rail. The brackets D are also formed on the upper side with a slot guide or groove E and rollers $d'$ to receive and guide the longitudinal stays F of the frame or carrier B. Each rail C preferably carries two brackets D one to support the front and the other the back of the frame or carrier B. Two or more of the brackets D are pivoted to a link G which is again pivoted to a lever $g$ keyed to a shaft $g'$ which runs the length of the machine in such a manner that if one of the brackets is moved backwards or forwards corresponding motion is given to all the other brackets connected to the frame or carrier. The body of the frame or carrier B is preferably formed of longitudinal stays F connected together by suitable cross stays $f$ and the workholder or ring H may be supported on a table mounted thereon somewhat as shown in Figs. 11 and 13 or may be carried by guides J mounted on suitably arranged stay rods $f'$ as shown in Figs. 2 and 16. It will be seen therefore that with this construction a universal parallel motion of the frame is obtained and an operator moving the frame about at one head of the machine while working a design gives an identical movement to the workholder under each head so that an identical design is worked at the same time by each head of the machine.

In the modified construction shown in Figs. 7 and 8 the frame B which may again be built up of stays or be in the form of a plate K as shown in the drawings is connected by lazy-tongs or similar guides or bars $k$ to a central or other movable bar $k'$ and to a fixed bar $k^2$ and rests upon the base plate L of the machine, which is preferably formed with rings $l$ of balls round the sewing apertures to facilitate movement of the frame. In the form of the invention shown in Figs. 9 to 11, resting directly upon the base plate L of the machine a plate or frame M is mounted having on its under surface two or more runways or grooves $m$ for balls which traverse the frame longitudinally resting on the base plate L or on a separate plate or base N thereon which on the top has corresponding runways or grooves $n$ for the balls. The plate or frame M is also formed with runways or grooves $m'$ on top placed transversely. A third frame O is provided with corresponding cross runways or grooves $o$ on the bottom side and circular runways or grooves $o'$ on the top. These frames are superimposed one upon the other and on the third frame are placed the work holders or rings H.

If desired the frames N, M, and O Figs. 9 to 11 may be used in conjunction with the frame K shown in Figs. 7 and 8.

In addition to a universal parallel motion a uniform circular movement may be given to all the workholders or rings. As shown in Fig. 13 the workholders or rings H are mounted upon the rings of balls $o'$ so that they may be easily rotated and provided on their peripheries with teeth, which gear with pinions $h$ arranged between the several workholders and transmit any rotary movement given to one workholder to all the others. Instead of intermediate pinions $h$ the motion may be transmitted by a rack which engages all the workholders. Or again if desired as shown in Fig. 15 a rack Q may be employed with intermediate pinions $q$ arranged between it and the work holders H.

In another modification as shown in Fig. 2 the workholders H may be provided on their peripheries with pins or teeth $h'$ which engage an endless perforated band R carried by rollers $r$ on the frame so arranged as to direct the band into engagement with the teeth, so that when circular movement is given to any one of the workholders all the workholders are correspondingly rotated.

The invention has been described above as applied to a sewing machine but it is obvious that it is just as applicable to any similar machine with separate heads or tools in which it is desired to duplicate multiply or reproduce a design figure or the like upon a number of surfaces at one and the same time.

What we claim as our invention and desire to protect by Letters Patent is:—

1. A movable work holder comprising in its construction a carrier frame B, rails C upon which the frame is mounted movable brackets D interposed between the frame and the rails which traverse the rails in one direction and over which the frame travels in a direction at an angle thereto and a number of annular work supports carried by the said frame and means for rotating the annular work supports simultaneously substantially as described.

2. A movable work holder comprising in its construction a carrier frame B, rails C upon which the frame is mounted, movable brackets D interposed between the frame and the rails which traverse the rails in one direction and over which the frame travels in a direction at an angle thereto and a number of annular work supports carried by the said frame and a perforated band R by which the annular work supports are rotated simultaneously substantially as described.

3. A movable work holder comprising in its construction a carrier frame B rails C upon which the frame is mounted, movable brackets D interposed between the frame and the rails which traverse the rails in one direction and over which the frame travels in a direction at an angle thereto, and a number of annular work supports carried by the said frame, links G attached to the brackets D, levers $g$ pivoted to the links G, and shaft $g'$, to which the links G are keyed whereby the brackets D are connected and caused to move synchronously substantially as described.

In witness whereof, we have hereunto signed our names in the presence of two subscribing witnesses.

WALTER W. SEFTON.
ACHESON HARDEN GLENDINNING.

Witnesses:
  JNO. GILBERT,
  FLORENCE A. BROWN.